Feb. 5, 1946.  J. H. HOERN  2,394,381
WIRE FINISHING APPARATUS
Filed Jan. 21, 1944  5 Sheets-Sheet 1

INVENTOR.
Joseph H. Hoern.
BY
Harness, Dickey & Pierce.
ATTORNEYS.

Patented Feb. 5, 1946

2,394,381

UNITED STATES PATENT OFFICE 2,394,381

WIRE FINISHING APPARATUS

Joseph H. Hoern, Birmingham, Mich., assignor to Eaton Manufacturing Company, Cleveland, Ohio, a corporation of Ohio Application January 21, 1944, Serial No. 519,143

7 Claims. (Cl. 29—33)

This invention relates to apparatus for imparting a high degree of finish to cylindrical metallic wire or rods, the principal object being the provision of apparatus of this type by means of which a desirably smooth surface of high quality be imparted to such wire or rods in a relatively quick and economical manner.

While the apparatus of the present invention is applicable for use in finishing both wire and rods of round section, the latter, whether in coiled or straight form, for the purpose of simplicity in description reference in the following specification and claims will be made only to wire, the application of the apparatus to so-called rods being made apparent to those skilled in the art therefrom and the term "wire" thus being understood to include both wire and rods.

Objects of the invention include the provision of apparatus for operating upon round metallic wires so as to impart a desirable degree of surface finish thereto; the provision of apparatus for finishing wire including a rotating cutter blade arranged to cut away the surface layer of the wire; the provision of apparatus of the type described so constructed and arranged that the surface layer of the wire may be removed in a quick and accurate manner in itself capable of imparting a relatively high degree of finish to the wire; the provision of apparatus of the type described in which the rotating cutter blade is so driven as to have a minimum cutting speed of two hundred feet per minute; the provision of apparatus of the type described in which means are provided for maintaining the wire under a relatively high degree of tension during the turning operation thereon; the provision of apparatus of the type described in which means are provided for definitely sizing the wire prior to the turning operation thereon; the provision of apparatus of the type described in which means are provided for supporting the tensioned wire immediately adjacent the point of contact of the cutter blade therewith; the provision of wire finishing apparatus including means for removing the surface layer of the wire and subsequently completing the finishing of the surface of the wire by a honing operation; the provision of wire finishing apparatus of the type described in which the means for honing the wire comprises a hollow honing device through which the wire is adapted to be drawn under tension and including a plurality of abrasive blocks or elements having both a rotary and a reciprocatory movement with respect to the axis of the wire being operated upon thereby; the provision of a novel form of honing mechanism for finishing wire; and the provision of wire finishing apparatus including a number of work performing units and/or devices which may or may not be of novel construction in and of themselves, but which in any event are arranged in combination with each other to provide a new and novel structure having great utility.

The above being among the objects of the present invention, the same consists in certain novel details of construction and combinations of parts to be hereinafter described with reference to the accompanying drawings and then claimed, having the above and other objects in view.

In the accompanying drawings which illustrate a suitable embodiment of the present invention and in which like numerals refer to like parts throughout the several different views.

There is a large number of instances in which it is desirable, if not necessary, that round metal wire have a high degree of finish. One of the most important instances is wire which is to be employed to produce relatively heavily stressed coil springs as, for instance, the valve springs of high performance internal combustion engines. In such instances the springs are subjected to a relatively heavy load in service and under which the material of the springs is stressed to a degree approaching its elastic limit. If such springs have any slight surface imperfection, it engenders failure of the springs at the location of such imperfections, and it is therefore important that any such surface imperfections be eliminated and the surface of the spring stock from which the spring is made be of such smooth character as to eliminate any scratches, blemishes, or other surface imperfections which might engender breaking of the spring. Other equally important instances where the use of a smoothly-finished wire is desired will be appreciated by those skilled in the art.

Particularly where such wire stock is to be employed in the formation of steel springs, the stock is usually of a hot rolled character which, as received from the mill, often has scale adhering thereto and usually a more or less pitted surface. It is therefore essential that the boundary layer of such wire stock be removed and the surface rendered free of scale, scratches, and/or other surface imperfections before being formed into springs. Passing the wire through drawing dies is of no avail in this respect, for if the surface of the wire is rough before it is passed through the drawing die, it will retain the surface imperfections causing such roughness to a greater or lesser degree in the drawn product.

Attempts have heretofore been made to finish wire, including the step of removing the surface boundary thereof, by both rotating and strip-abrasive means, and it has even been proposed to remove the surface boundary by means of a rotating cutter blade rotating about the axis of the wire. However, as far as I am aware, the means as heretofore provided has been relatively slow and therefore expensive with varying and not too uniform a result. It is therefore the principal object of the present invention to provide an apparatus for finishing wire, including the removal of the surface boundary layer thereof in a quick and economical manner and which will result in a wire having a uniformly-smooth surface of high character finish.

In accordance with the present invention the wire being operated upon is drawn between a pair of spaced tensioning units so constructed and arranged as to maintain the wire between them under a high degree of tension, but not sufficient to overcome the tensile strength of the wire and thereby effect a decrease in diameter for that reason. The advance tensioning unit may optionally include or consist of a reducing die of the wire drawing type, and this has been found to be advantageous, particularly where scale remains upon the wire and which is desirably removed before the turning operation thereon. Between the tensioning units is arranged a rotating cutter head through which the wire passes and which carries a cutter blade functioning to cut away the surface boundary layer of the wire. The point of engagement between the cutter blade and the wire is arranged immediately adjacent the point of support of the wire by one of the tensioning units, the wire thus being maintained in a relatively rigid condition at the time the point of the cutter blade acts upon it.

In accordance with one phase of the present invention, the cutter blade is operated at an unusually high cutting speed, namely, at a minimum speed of approximately two hundred feet per minute and preferably at a higher cutting speed in the neighborhood, for instance, of five hundred feet per minute. This feature, coupled with a relatively low feed of the wire axially thereof for each revolution of the cutter blade, has been found in and of itself to be capable of producing a superior quality of finish to the wire being operated upon thereby with the result that it may be often satisfactorily used in its "as turned" condition. Additionally, and particularly where the diameter of the wire is required to be held within extremely close limits, the wire after such turning operation may be passed through a conventional type of wire drawing die to reduce it to the required and accurately controlled diameter, the finish in such case not being adversely affected particularly where the wire drawing die itself is in the proper condition of finish.

In many cases, however, a superior finish to that capable of being produced by the turning operation itself may be desired or found necessary, and in such case the wire after passing through the turning apparatus may be conducted through a honing unit in which its surface is honed and thereby brought to an exceptionally high degree of finish, after which the wire may be coiled up if desired for future use. Even in case the wire is honed as thus described, if its diameter is necessarily maintained between limits not conveniently possible to maintain in the finishing apparatus thus described, it may, as previously described, then be passed through a wire drawing die of conventional construction to bring its diameter to within the required limits, this operation as previously explained having no appreciable effect on the desired high finish of the wire where the drawing die employed is in proper condition.

The honing device itself may, in the broader aspects of the invention, be of any desired type or construction, but in accordance with a more limited phase of the present invention it is preferably of a type in which the abrasive blocks or elements with which it is provided are not only caused to rotate about the wire being operated upon but to be relatively reciprocated with respect thereto as well, the various abrading points on the faces of the abrasive elements in such case traveling over the surface of the wire in such a manner as to produce an unusually high degree of finish thereon.

Figure 1:
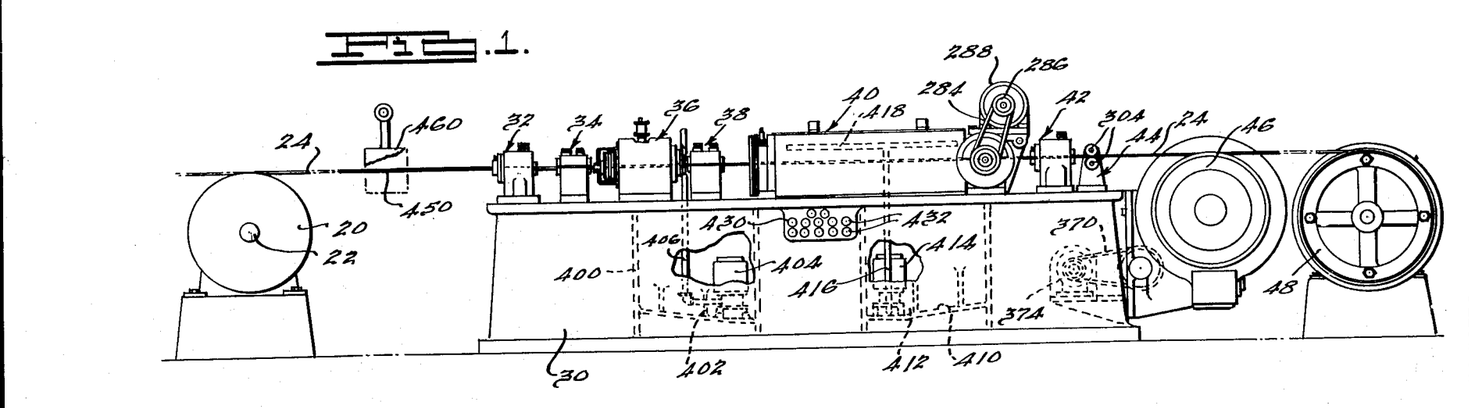
Fig. 1 is a side elevational view of my improved wire drawing apparatus.
Figure 2:
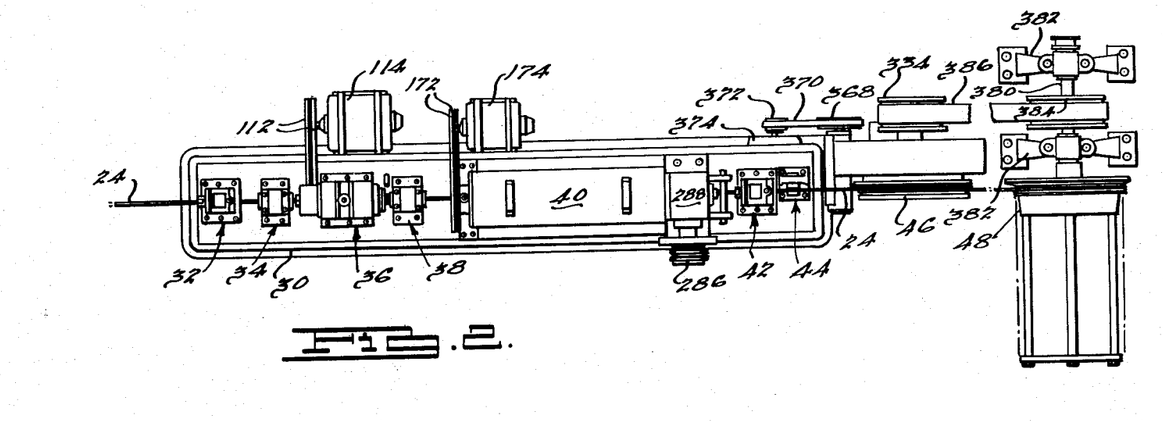
Fig. 2 is a plan view of the apparatus shown in Fig. 1.

Referring now to the accompanying drawings and particularly to Figs. 1 and 2, it will be appreciated that the wire sought to be operated upon may be delivered to the machine either in straight or coiled form and that where coiled will be upon a reel (not shown) and in being delivered to the machine will ordinarily be passed through a roller leveler or other suitable form of straightening device (not shown) before being presented to the machine for operation thereon. Preferably the wire in passing to the machine will pass over a suitable supporting roll such as 20 illustrated in Fig. 1 rotating about an axle 22 and with its upper surface in, approximately, alignment with the line of passage of the wire through the machine. In any event, the wire is indicated generally at 24.

The machine itself comprises a hollow cast base 30 adapted to rest directly upon a floor or other supporting surface and having an upper flat face upon which the following units or devices are arranged in succession and with the axes of their respective wire receiving bores in alignment with each other. First, there is one or more wire tensioning devices, in the drawings shown as two, namely indicated generally at 32 and 34, respectively, either one or both of which may be employed. The initial wire tensioning device or devices is or are followed by a turning unit indicated generally at 36, and the turning unit 36 is followed by a supporting and tensioning unit indicated generally at 38 and which, as hereinafter will be explained in more detail, may be identical to the unit 34. The unit 38 is in turn followed by the honing unit 40, where employed, and where employed then optionally through an additional tension unit 42 which may be identical to the tension units 34 and 38, and then through a guide indicated generally at 44 from which the wire 24 passes around a winch drum 46 and from which it may pass to a conventional winding reel indicated generally at 48. Thereafter, as previously explained, if the wire is required to be held within narrow limits of diameter not readily possible to hold in the apparatus thus described, it may thereafter be passed through a conventional drawing die to attain this last-mentioned result. The winch drum 46 does, of course, serve as a tension or tensioning unit or device itself and may be included within that term in the following claims.

Figure 3:
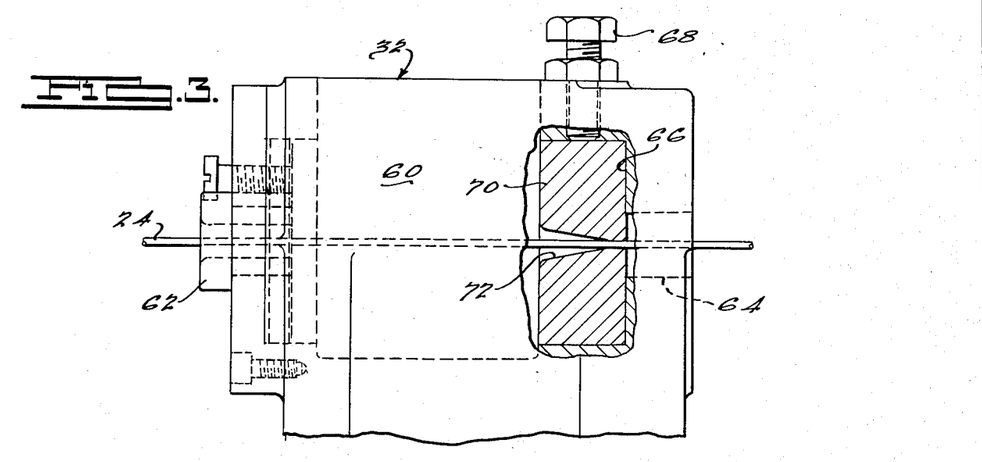
Fig. 3 is an enlarged side elevational, partially broken, partially sectioned view illustrating the details of construction of a wire-tensioning unit or device for initially receiving the wire during its passage through the machine shown in Figs. 1 and 2.

The tension unit 32, as brought out in Fig. 3, comprises a hollow head or body 60, the outer or left-hand end of which is provided with a hollow bushing 62 through which the wire 24 is more or less loosely received, and at its right-hand or discharge end is provided with an opening 64 through which the wire 24 passes out of the device. Inwardly of the opening 64 the head or body 60 is internally provided with a cylindrical recess 66 concentric with the axes of the bushing 62 and opening 64, and received therein and secured against movement therein by means of a set or locking screw 68 is a die 70 of a conventional type employed in wire drawing and provided with an axial tapered opening 72 through which the wire 24 passes. The small end of the opening 72 is slightly smaller than the initial diameter of the wire 24 as received from the mill, so that in being drawn through the die 70, the diameter of the wire is slightly reduced. Three effects are obtained from the unit 32 and both of which may be important. The first effect is to provide a drag tending to retard the passage of the wire 24 through the die 70 so as to place the wire 24 under tension between the tension units at opposite ends of the turning unit. Another function is to break and loosen up any scale that may be carried by the surface of the wire 24 so that in a subsequent turning operation the cutter blades will not be subject to the abrading effects of the hard scale on the surface of the wire if present. The remaining function is to definitely size the wire prior to its reception by the turning head so that the cutter blade of the turning head or unit will always have a constant depth of cut on the wire 24.

It will be appreciated, of course, that the amount of reduction effected by the die 70 on the wire 24 may be sufficient to provide the desired amount of resistance to pulling the wire 24 through it and in such case it is not essential that the second tensioning unit 34 be employed. On the other hand where the wire stock being operated upon is free of surface scale and its diameter as received from the mill is held between sufficiently close limits, then the unit 32 may be dispensed with and the tensioning unit 34 alone be employed. However, in most cases it will be found desirable to use both units 32 and 34 as shown.

Figure 4:
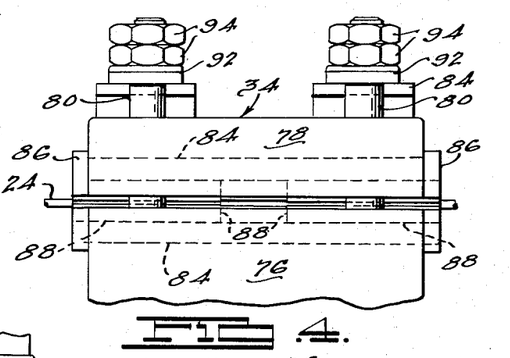
Fig. 4 is an enlarged fragmentary, side elevational view of another wire-tensioning unit or device through which the wire initially received by the machine shown in Figs. 1 and 2 may be passed and which may be used either alternately with the device shown in Fig. 3 or in combination therewith.
Figure 5:
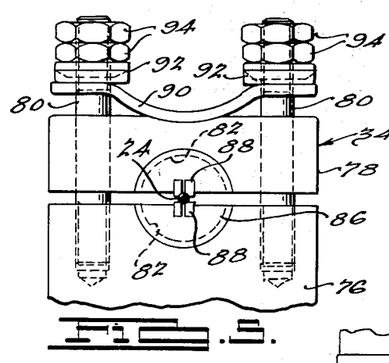
Fig. 5 is an end elevational view of the apparatus shown in Fig. 4.

The unit 34 as best brought out in Figs. 4 and 5 comprises a block 76 suitably secured to the upper surface of the base 30 and provided with a flat upper face located slightly below the axis of the wire 24. Above the base 76 is a cap member 78 of substantially the same horizontal dimensions as the base 76. A plurality of transversely aligned studs 80 are threaded into the base 76 and project vertically therefrom and are slidably received in complementary openings formed in the cap 78. The opposed faces of the block 76 and cap 78 are each provided with opposed and substantially semi-cylindrical recesses 82 therein, the center of curvature of such recesses 82 extending longitudinally of the block 76 and cap 78 midway between the opposite sides thereof. Within the opposed recesses 82 is received a split spool member 84, the end flanges 86 of which are spaced axially of the spool member 84 by a distance equal to the length of the block 76 and cap 78 and engage the corresponding end faces thereof as best brought out in Fig. 4, which thus serves to lock the spool member 84 against axial movement in the blocks 76 and cap members 78. The line of split of the spool member 84 is diametrically thereof and such line of split is aligned with the space between the opposed faces of the blocks 76 and cap members 78.

Each half of the spool member 84 is longitudinally and centrally grooved on its split face, and in each end of such groove in each half of the spool member 84 is received a wear member 88 rigidly fixed in position therein. The opposed faces of the wear members 88 at each end of the spool member 84 project inwardly toward one another beyond the corresponding faces of the block member 76 and cap member 78, and they are centrally and longitudinally grooved to a cross-sectional configuration complementary to a portion of the exterior surface of the wire 24, and the wire 24 is received therebetween as best brought out in Fig. 5. It is to be particularly noted that the wear members 88 extend axially into flush relationship with respect to the outer face of the flanges 86 at the corresponding ends of the spool member 84.

Freely received over each transversely-aligned pair of studs 80 above the cap member 78 are the free apertured ends of a downwardly-bowed leaf spring member 90 which centrally rests upon the upper surface of the cap member 78. Received on each stud 80 over the associated end of the corresponding spring 90 is a spherical washer assembly 92 which is followed by a pair of nuts 94 threaded on the upper end of each stud 80. The nuts 94 acting through the washer 92 upon the free ends of the spring 90 act through the spring 90 to resiliently press the cap member 78 downwardly toward the block member 76 and thus frictionally clamp the wire 24 between the wear members 88. In practice the nuts 94 are threaded downwardly upon the studs 80 to a sufficient extent to build up a desired amount of friction between the wear strips 88 and the wire 24 to cause a desired amount of tension to be built up on the wire 24 upon the latter being drawn through the unit 34. It will be appreciated, of course, that where the device or unit 34 is employed alone and without the simultaneous use of the unit 32, then the unit 34 will be adjusted to cause a greater resistance to pulling the wire 24 therethrough than it would be in the case where the unit 32 is employed simultaneously therewith.

As previously stated, the wire 24 after emerging from the tension device or unit 34 passes through the turning head or unit 36 and then through an additional tension device 38. The tension device 38 may be considered identical to the tension device 34 and may be considered identical thereto for the purposes of the present description, the various parts thereof being indicated by the same numerals as are the parts of the unit 34. Consequently, no further description of the tension unit 38 is necessary.

Figure 6:
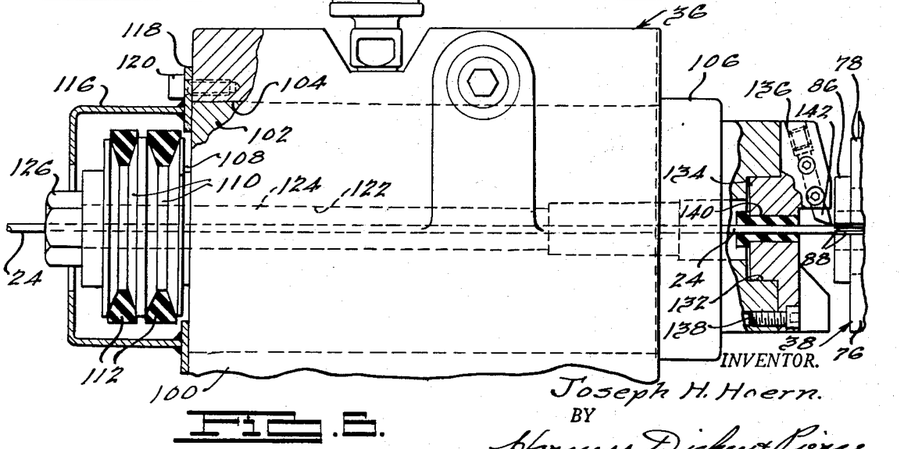
Fig. 6 is a fragmentary, partially broken, partially sectioned side elevational view of the cutter or turning head for the wire drawing apparatus shown in Figs. 1 and 2 and which is positioned to receive the wire following its passage through the devices shown in Figs. 3 and 4 or either one thereof.

The turning unit which is best brought out in Fig. 6 comprises a preferably cast body 100 which is fixed to the flat upper face of the base 30 between the tension units 34 and 38. It is provided with a central rotatable spindle 102 which for the purpose of illustration only is shown as being rotatably mounted directly in the bore 104 thereof, but it will be understood in actual practice that suitable and preferably anti-friction bearing devices will preferably be provided between the spindle 102 and the body 100 to enable the spindle 102 to rotate continuously at a relatively high speed.

In the structure shown by way of illustration the forward end of the spindle 102 is provided with a head or flange 106 at its right-hand end which abuts against the corresponding end face of the body 100 to limit axial movement of the spindle 102 to the left. Other suitable or conventional means (not shown) serve to limit movement of the spindle 102 to the right. The left-hand end of the spindle 102 is reduced in diameter as at 108 and receives thereon a double pulley 110, in each groove of which is trained a V-belt 112. An electric motor 114, as best brought out in Fig. 2, is mounted upon the side of the frame 30 and is provided with a suitable driving pulley (not shown) over which the belts 112 are trained so that upon rotation of the motor 114 the pulley 110, and therefore the spindle 102 will be rotated. It might be noted, and as will be apparent from an inspection of Fig. 2, that the pulley on the electric motor 114 is of larger diameter than the pulley 110 so that the spindle 102 will be driven at a higher rate of speed than the shaft of the motor 114. A protective housing 116 is provided over the pulley 110 and is provided with an attaching flange 118 through which screws 120 pass and thread into the body 100 to secure the housing 116 in place. The attaching flange 118 extends inwardly of the housing over the joint between the spindle 102 and the corresponding end of the housing so as to aid in sealing the bearing surfaces for the spindle against the entrance of dust and dirt.

The spindle 102 is provided with a bore 122 into which an axially apertured guide rod 124, having a hexagonal head 126, is introduced from the left-hand end thereof as viewed in Fig. 6. The bore of the guide rod 124 is slightly larger in diameter than the diameter of the wire 24. The right-hand end of the spindle 102 beyond the flange 106 is provided with an enlarged but relatively shallow bore 132 concentric with the axis of the spindle 102 and a pilot portion 134 of a cutting head 136 is closely but removably received within the bore 132, the cutting head 136 being secured to the end of the spindle by means of screws 138.

The cutting head 136 is provided with an axial bore in which a rubber bushing or sleeve 140 is received, the bushing or sleeve 140 being provided with a central opening in which the wire 24 is relatively closely but rotatably and slidably received. The cutting head 136 is provided with a cutter blade 142 adjustably secured therein for movement in a direction approximately radially of the center of rotation of the head 136 but preferably slightly inclined radially inwardly in the direction of movement of the wire 24 therethrough as shown in Fig. 6. The cutter blade 142 terminates in a cutting point positioned to engage the surface of the wire 24 immediately adjacent the adjacent end of the tension unit 38, as brought out in Fig. 6, so that as will be appreciated, it engages the wire 24 at a point where it is substantially rigidly supported by the wear members 88 of the tension unit 38.

In accordance with the present invention the cutter blade 142 is of the same character that is employed for so-called diamond turning or boring practices, that is, it is either provided with a diamond tip, or its tip is provided with a cutting surface of tungsten carbide or equivalent material, and the spindle 102 is rotated at a high rate of speed. Preferably the spindle 102 is rotated at such rate of speed that the rate of movement of the point of the cutter blade 142 with the wire 24 will be in excess of two hundred feet a minute and may run as high as a thousand feet per minute or more. A rate of approximately five hundred feet per minute has been found to be very satisfactory. This means that with a wire 24 three-sixteenths of one inch in diameter, it requires the spindle 102 to rotate at a speed of approximately ten thousand revolutions per minute.

In connection with the last-mentioned feature, that is, the cutting speed of the point of the cutting tool 142 with respect to the surface of the wire 24, it has been found that by employing this high rate of cut the relative amount of axial feeding movement of the wire 24 with respect to the cutter blade 142 for each revolution of the cutter blade 142 may be extremely small yet will permit the wire 24 to be fed axially through the device at a relatively rapid rate. It has been found that by employing the high cutting speed and relatively slow feeding movement between the wire and the cutter blade, an unusually smooth and bright surface may be imparted to the wire 24, and in fact, it produces a surface finish for the wire 24 substantially equivalent to what is known in the trade as a ground finish. In fact, the character of the finish imparted to the wire in the turning unit 36 is ordinarily of such character that except in the most exacting cases, further finishing operations on the wire 24 may be dispensed with.

It is to be noted that inasmuch as the wire 24 in passing through the turning unit 36 is tensioned to the extent required to pull it through the tension unit 32 and 34 or either of them if employed alone, the wire 24, because of such tension, is, in and of itself, substantially rigid in passing through the unit 36, and inasmuch as the cutter blade 142 engages the wire 24 immediately adjacent the wire-receiving end of the tension unit 38 and the wire 24 is further supported by the rubber bushing or sleeve 140 on the opposite side of the cutter blade 142 but in relatively close relation with respect thereto, very little, if any, deflection of the wire 24 occurs at the point the cutter blade 142 acts upon it. For this reason and the fact that a constant depth of cut is being taken on the wire by the cutter blade 142, it is possible to turn the wire 24 to a diameter which may be maintained between relatively close limits but, as previously mentioned, where the diameter of the wire is required to be held within limits difficult if not impossible to hold during usual operation of the turning unit 36, then the wire 24, after it emerges from the tension unit 38 and if it is not required to further enhance the finish thereof as by passing it through the honing unit 40, may be passed through a conventional wire drawing die to bring it within the required limits of size.

Where an unusually high degree of finish is desirable or necessary, then the wire 24, after it emerges from the tensioning unit 38, passes through the honing unit 40 for further surface-finishing operations. In passing through the honing unit 40, it is maintained under a tension of the same character as in the turning unit 36, and this is accomplished by leading it over the motor-driven winch 46 which in fact is responsible for maintaining the wire 24 under tension throughout the entire length of the machine. If desired, although not necessary in all cases, the tension unit 42 may be provided at the discharge side of the honing unit 40, and the tensioning unit 42 may be of identical construction to the tensioning units 34 and 38 previously described.

Figures 7, 8:
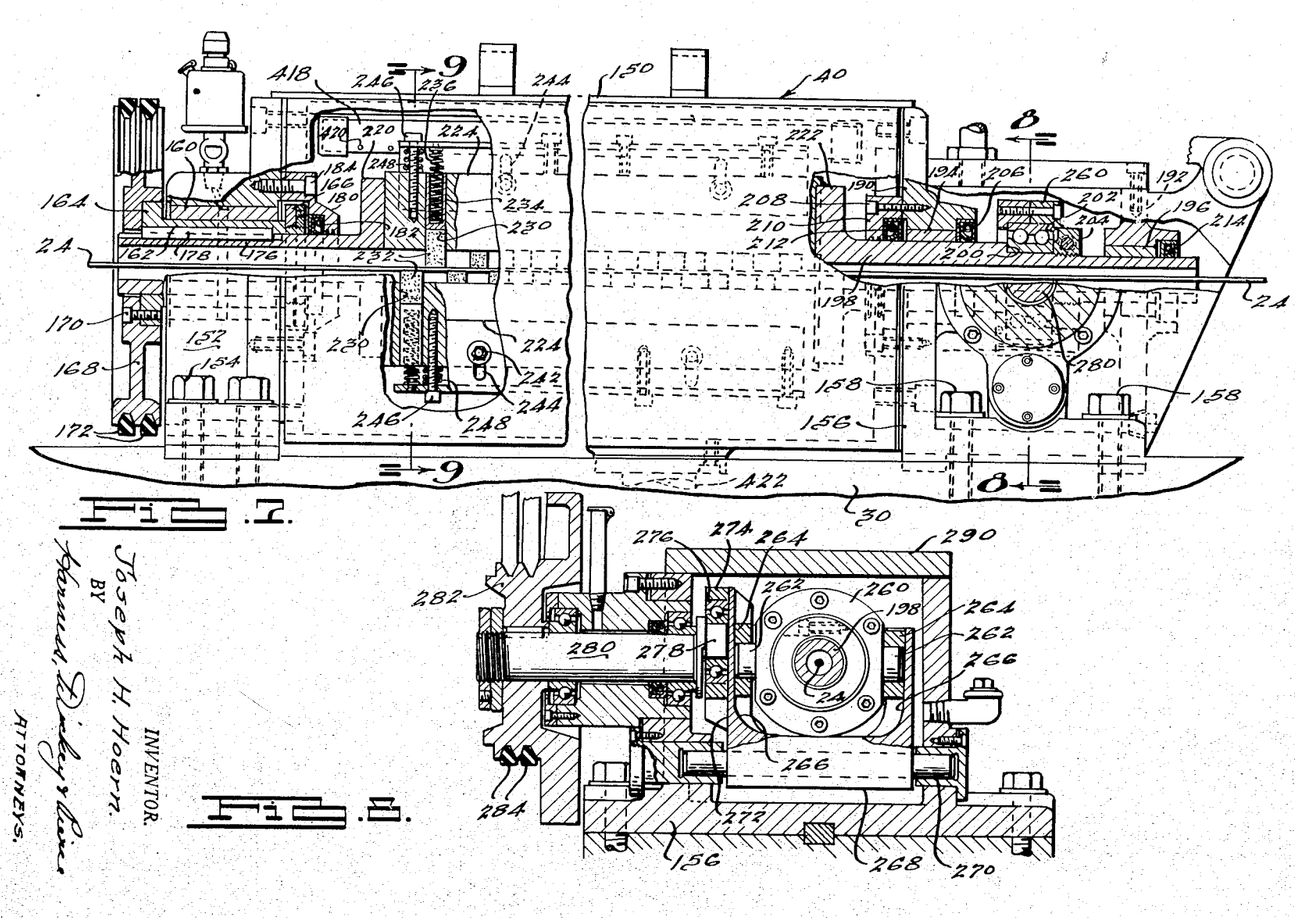
Fig. 7 is a fragmentary, partially broken, partially sectioned side elevational view of the honing unit or device employed in the wire finishing apparatus shown in Figs. 1 and 2.
Fig. 8 is a transverse sectional view taken on the line 8—8 of Fig. 7 and more clearly illustrating the reciprocating mechanism for the honing unit.

As best brought out in Fig. 7, the honing unit 40 comprises a metal housing 150 supported at its advanced or left-hand end by a cast member 152 seating on the flat upper face of the base 30 and secured thereto by means of bolts 154. The opposite end of the housing 150 is supported by means of a cast member 156 also seating on the flat upper face of the base 30 and secured thereto by means of bolts 158. The member 152 is provided with a central bore concentric with the path of movement of the wire 24 through the machine and which bore is lined by a bearing bushing 160 in which is rotatably received a hollow shaft 162 flanged at one end as at 164 so as to limit movement of the same to the right as viewed in Fig. 7 and provided with a flange ring 166 threaded on its opposite end and suitably locked against movement and co-operating with the corresponding end face of the member 152 to limit movement of the shaft 162 to the left. A double V-belt pulley 168 is mounted upon the flange 164 and fixed against movement with respect thereto by means of screws 170. A pair of V-belts 172 trained over the pulley 168 extend over a similar pulley (not shown) fixed to the shaft of an electric motor 174 mounted on the side of the base 30, as shown in Fig. 2, the motor 174 thus serving to rotate the shaft 162.

Referring again to Fig. 7, it will be noted that a second hollow shaft 176 is received within the hollow shaft 162, keys 178 being operatively interposed between the shafts 162 and 176 to permit axial movement of the shaft 176 within the shaft 162, but connecting the two together for equal rotation. A housing member 180 surrounding the shaft 176 at the inner end of the member 152 contains a dust and grease seal 182 for sealing the joint between it and the shaft 176 and is secured to the member 152 by means of screws 184.

The member 156 supporting the opposite or right-hand end of the housing 150 is of hollow construction having an inner wall 190 and an outer wall 192 spaced therefrom axially in the direction of the length of the machine, the walls 190 and 192 being centrally apertured in concentric relation with respect to the path of movement of the wire 24 therethrough and such apertures being provided with bearing bushings 194 and 196 respectively, the bore of the latter bushing being smaller than that of the former. Rotatably and axially slidably received by the bushings 194 and 196 is a hollow shaft 198 having an outer surface stepped in accordance with the diameters of the bushings 194 and 196 to provide a radial shoulder 200 against which an anti-friction bearing assembly 202 surrounding the shaft 198 is clamped by means of a locking nut 204. The wall 190 at the outer or right-hand side of the bushing 194 therein is provided with a conventional sealing device 206 in surrounding relation with respect to the shaft 198, and at its inner or left-hand side the wall 190 has fixed thereto as by means of screws 208 a housing 210 in surrounding relation with respect to the shaft 198 and also carrying a conventional sealing device 212 in surrounding relation with respect to the shaft 198. A similar sealing device 214 is carried by the right-hand face of the wall 192 in surrounding relation with respect to the shaft 198.

Figures 9, 10, 11:
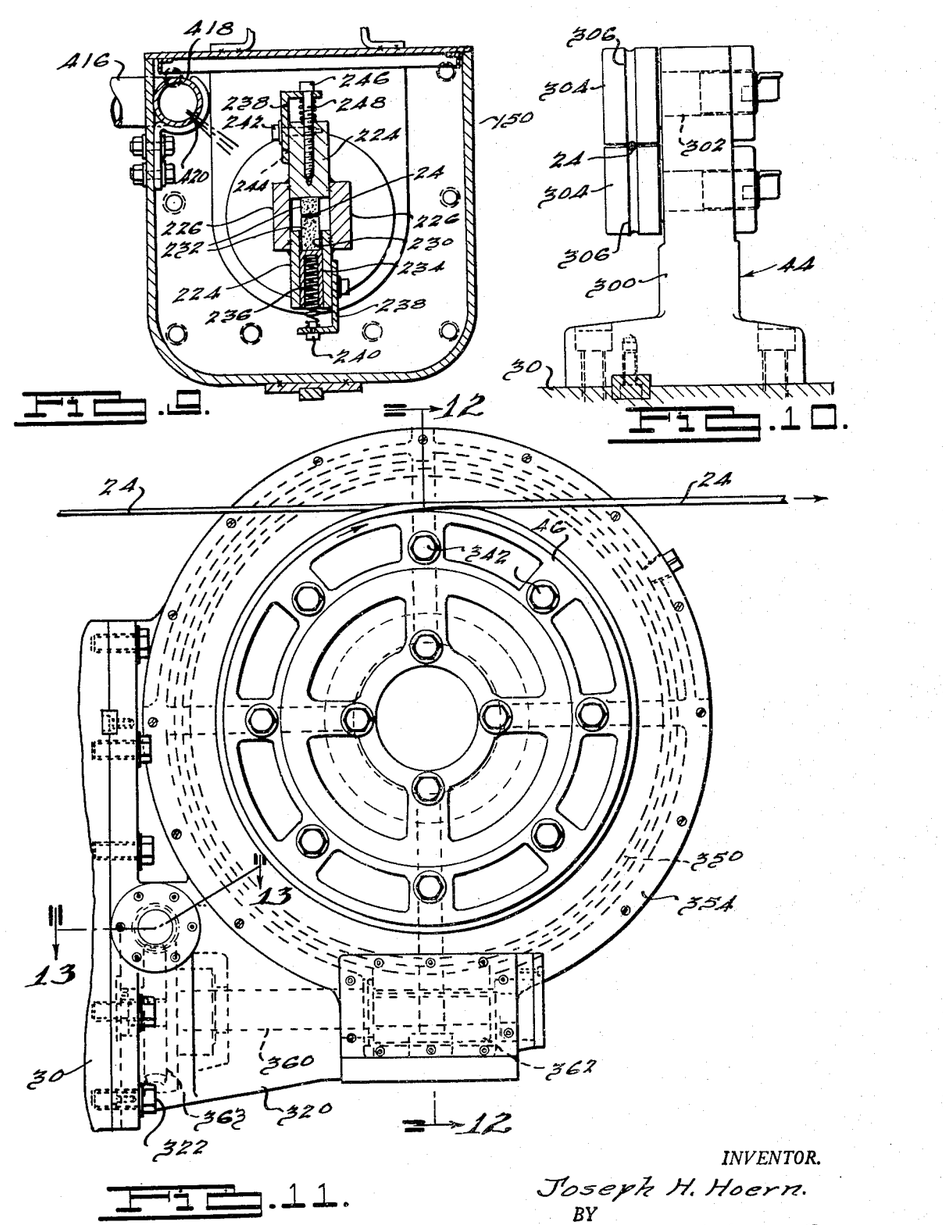
Fig. 9 is a transverse sectional view through the honing unit taken as on the line 9—9 of Fig. 7.
Fig. 10 is an end elevational view of the guide unit employed at the discharge end of the apparatus shown in Figs. 1 and 2 for guiding the wire onto the winch drum.
Fig. 11 is an enlarged fragmentary, side elevational view illustrating the construction of the winch drum unit in greater detail.

The inner or right-hand end of the shaft 176 is provided with a circular flange 220 concentric therewith and the inner or left-hand end of the shaft 198 is provided with a similar flange 222. Extending between the flanges 220 and 222 are a pair of bars 224 which, as best brought out in Fig. 9, are of rectangular section and are arranged in diametrically opposed relation to each other about the axis of rotation of the shafts 176 and 198, arranged with the plane bisecting their thickness passing through the axis of rotation of the shafts 176 and 198 and with their opposed faces in spaced relation with respect to each other and equidistant from the said axis of rotation. Their corresponding sides are bridged by plate members 226 secured thereto as by welding or the like and also extending between the flanges 220 and 222. The bars 224 and plates 226 are rigidly secured to the flanges 220 and 222 by any suitable means such as welding or the like. Thus the shafts 176 and 198 are rigidly connected together for equal rotation and axial sliding movement by means of the bars 224 and plates 226 which are therefore mounted for equivalent movement.

Each bar 224 at equally spaced points over its length is provided with a series of radial openings 230, the openings 230 in one of the bar members 224 being staggered axially of the axis of rotation thereof from the openings 230 in the other bar member 224. In each of the openings 230 an abrasive element in the form of a plug 232 is axially movably received and projects radially inwardly beyond the radially inner face of the corresponding bar member 224. Outwardly of each abrasive plug 232 a hollow cup-like plunger 234 is reciprocably received in each of the openings 230, and a coiled compression spring 236 is received within each of the plungers 234 and projects radially outwardly therefrom beyond the radially outer face of the corresponding bar member 224. An angle bar 238 is associated with each bar member 224 and is arranged with one of its legs in flat contacting relationship with respect to one of the lateral faces of the corresponding bar member 224 and the remaining leg thereof projecting over the radially outer face of the corresponding bar member 224 and in outwardly radially spaced relation with respect thereto. The upper ends of the springs 236 abut against the over-hanging flange of the corresponding angle bar 238 and are centered thereon by means of plugs 240, best shown in Fig. 9, which are fixed in the overhanging flange of the corresponding angle bars 238.

The angle bars 238 are secured in position on their corresponding bar members 224 by means of screws 242 which pass through slots 244 in the angle bars 238 and which slots are arranged with their longitudinal center line perpendicular to the length of the angle bars 238; in other words, in approximately radial relation with respect of rotation of the bar members 224. Thus the angle bars 238 are adjustable radially of the axis of rotation of the device by simply loosening the screws 242 and moving the angle bars 238 outwardly or inwardly. This provides a means for adjusting the tension of the springs 236.

In order to enable proper adjustment of the angle bars 238 radially of the axis of rotation of the device, at intervals over the length of the angle bars 238 screws 246 are projected through the over-hanging flanges thereof and project radially inwardly and are threaded into the corresponding bar members 224, coiled compression springs 248 being provided about each screw 246 and maintained under compression between the corresponding bar member 224 and over-hanging flange of the corresponding angle bar 238 so as to constantly urge the angle bars 238 outwardly against the heads of the screws 240. Thus, by loosening the screws 242 and turning the screws 246, the angle bars 238 may be adjusted radially outwardly or inwardly with respect to the axis of rotation of the device and vary the compressive force of the springs 236 accordingly.

It will, of course, be appreciated that the radially inner end of the abrasive plugs 232 bear against the wire 24 which extends centrally through the device and the amount of force with which they are caused to bear against the wire 24 is controlled by the tension of the springs 236.

It will be appreciated that when the electric motor 174 is energized it will be caused to rotate and, acting through the belts 172 and pulley 168, will cause the rotatable unit, including the abrasive plugs 232 above described, to rotate in accordance therewith and that the abrasive plugs 232, in being pressed against the wire 24 and rotating about it, will, of course, have an abrading and polishing effect upon the surface of the wire 24 engaged thereby. If desired, the abrasive plugs 232 at the entering or lefthand end of the device, as illustrated in Fig. 7, may be provided with coarser particles of abrasive than those at the righthand end thereof so that the wire 24 will receive a progressively finer finish as it progresses through the length of the honing unit 40. However, in order to obtain the desired honing effect of the abrasive plugs 232 upon the wire, it is not only desirable to rotate them about the wire 24 but also to impart a bodily shiftable movement thereof axially of the wire during such rotation as it is recognized that in such case a more perfect finish is obtainable thereby. The unit thus far described is mounted for axial shiftable movement as above mentioned so that this result may be obtained and the mechanism called for obtaining this axial shifting movement will now be described.

Within the hollow interior of the end member 156 a radially split collar member 260 is clamped about the outer race of the anti-friction bearing assembly 202 as brought out in Figs. 7 and 8. On its diametrically opposite sides the collar member 260 is provided with radially outwardly projecting pins or trunnions 262 each of which is rotatably received within the central bore of the corresponding bearing block 264. Each bearing block 264 is slidably received for bodily shiftable movement in a groove 266 formed radially in the opposed faces of the opposite arms of a yoke member 268 which is pivoted in the member 156 adjacent the bottom thereof by means of a horizontally directed shaft 270. As will be appreciated, oscillation of the yoke member 268 about the axis of the shaft 270 will effect axial shifting movement of the rotatable unit carrying the abrasive or honing plugs 232, the bearing blocks 264 moving radially of the shaft 270 in the corresponding recesses 266 during such axial shifting movement of the honing unit.

In order to effect oscillation of the yoke member 268, the outer or lefthand face of the lefthand arm of the yoke member 268, as brought out in Fig. 8, is provided with a recess 272 therein arranged radially of the axis of the shaft 270. In this recess 272 is slidably received a bearing block 274 which carries an anti-friction bearing assembly 276 within which is received the crankpin 278 of a crank 280 suitably rotatably mounted in the member 156. As will be appreciated, rotation of the crank 280 will, acting through the crank pin 278 thereof and bearing block 274, serve to oscillate the yoke member 268 about the axis of the shaft 270 and, therefore, effects axial reciprocatory movement of the assembly including the abrasive plugs 232.

Rotation of the crankshaft 280 is accomplished by means of a double V-belt pulley 282 fixed thereto outwardly of the member 176 and over which a pair of V-belts 284 are trained, the V-belts 284, as best brought out in Fig. 1, extending upwardly and over the pulley 286 of an electric motor 288 mounted on the top cover 290 of the member 156. Thus, when both the electric motors 174 and 288 are energized, the assembly carrying the abrasive plugs 232 is both rotated and bodily reciprocated within the housing 150, such abrasive plugs 232 acting on the wire 24 passing between them applying a honing operation to the surface of the wire to impart the desired high degree of finish thereto.

As previously mentioned, a tension unit 42 which may be identical to the tensioning units 34 and 38 previously described may be provided at the discharge end of the honing unit 40 if desired. In any event, it is preferable to provide a guide unit 44 at the discharge end of the honing unit 40 to guide the wire 24 in proper axial relation with respect to the honing unit during its passage therethrough as well as to properly guide the wire 24 over the winch drum 46. The guide unit 44, as best brought out in Fig. 10, comprises a bracket-like member 300 secured to the upper flat face of the base 30 and rotatably supporting a pair of horizontally directed vertically spaced shafts 302 each of which has secured thereto at one side of the bracket member 300 a roller 304. The rollers 304 are of such diameter that they substantially contact each other and each is preferably provided with a semi-circularly sectioned peripheral groove 306, the latter being aligned with each other and of such size as to relatively closely receive the wire 24 therebetween. The grooves 306 are so arranged with respect to the rollers 304 and the axes of the rollers 304 so arranged vertically of the bracket member 300 that the wire 24, in passing between them, is maintained substantially on the axis of the honing unit 40.

As previously explained, the wire 24 is drawn through the apparatus thus far described by means of the winch drum 46 which must thus provide a sufficient pull to overcome the resistance of the various tensioning units 32, 34, 38, and 42 or such thereof as are employed, as well as such other resistance as may be encountered in drawing the wire 24 through the device. The winch drum 46 is formed as a part of a unit which is bolted to the righthand end of the base 30, as viewed in Figs. 1 and 2, and the construction of which is as follows.

Figures 12, 13:
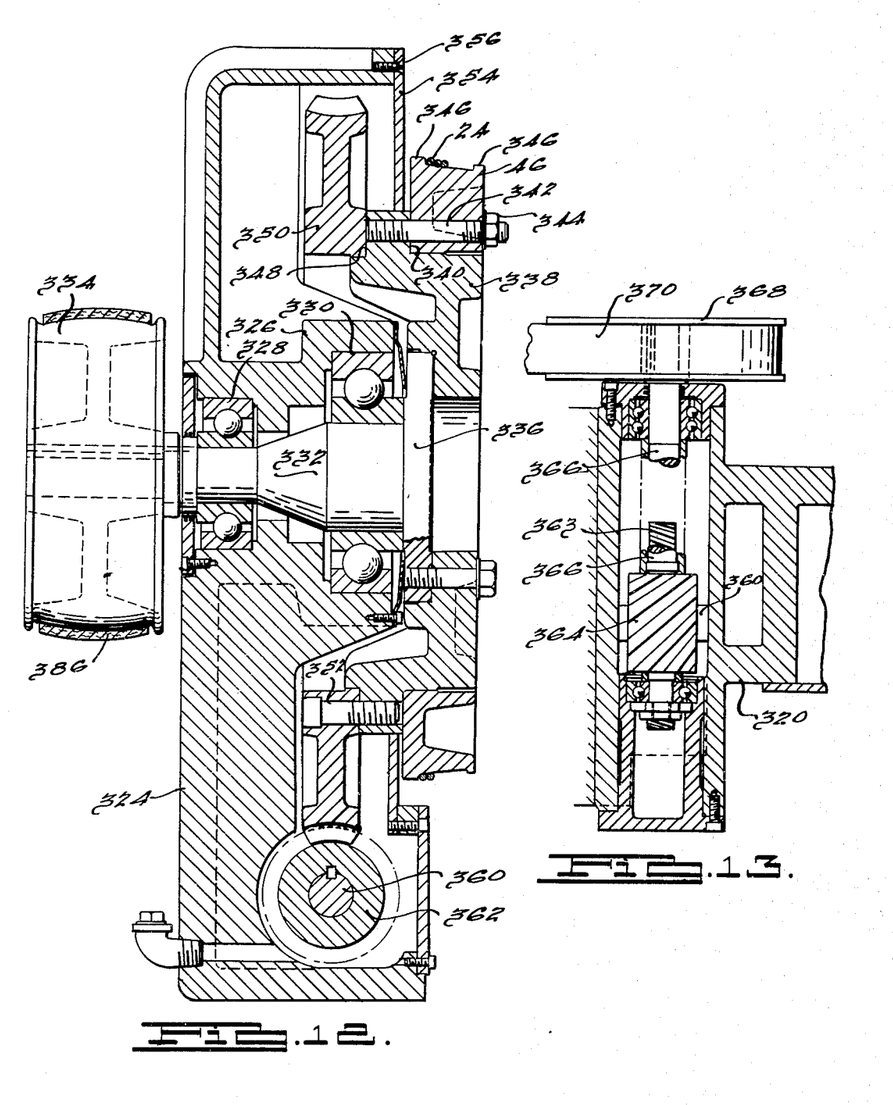
Fig. 12 is an enlarged sectional view taken diametrically through the winch drum and its driving mechanism as on the line 12—12 of Fig. 11.
Fig. 13 is an enlarged fragmentary, partially broken, partially sectioned view taken on the line 13—13 of Fig. 11, and illustrating a part of the drive mechanism for the winch drum.

A cast housing 320 is secured by means of bolts 322, as best brought out in Fig. 11, to the righthand end of the base 30. The housing 320 includes a hollow cylindrical or cup-like portion 324 arranged with its axis horizontal and transverse to the length of the base 30 and it is centrally provided with a hub structure 326 which, as best brought out in Fig. 12, is internally provided with anti-friction bearing assemblies 328 and 330 within which is rotatably received a shaft 332. One end of the shaft 332 projects outwardly beyond the housing portion 324 and has fixed thereto a pulley 334 which, as best brought out in Fig. 2, lies on the far side of the machine, as viewed in Fig. 1. The opposite end of the shaft 32 is provided with a concentric cylindrical flange 336 upon which a circular supporting ring flange 338 is piloted and secured in fixed relation with respect thereto. The ring flange 338 is provided with a concentric annular radial face 340 against which the winch drum 46 is secured by means of studs 342 and nuts 344 in concentric relation with respect to the shaft 32. The vertical position of the shaft 332 is such that the periphery of the winch drum 46 is substantially horizontally aligned at its top edge with the wire 24 as it passes through the rolls 304 of the guide unit 44. It may also be noted from Fig. 12 that the peripheral portion of the winch drum 46 is slightly tapered to provide a frusto-conical surface upon which one or more turns of the wire 24 are received, the axial end portions of the winch drum 46 being formed to provide relatively shallow radially outwardly directed annular flanges 346 to maintain the turns of the wire 24 thereon.

The ring flange 338 is provided with a second concentric radially directed annular abutment face 348 against which a worm wheel 350 is fixedly clamped by means of screws 352 in concentric relation with respect to the axis of the shaft 332. A face plate 354 secured to the open axial end face of the housing portion 324 by means of screws 356 separates the worm wheel 350 from the winch drum 46 and serves to protect the mechanism within the interior of the housing from the entrance of dust and dirt.

As best brought out in Figs. 11 and 12, a horizontally directed shaft 360 arranged with its axis extending longitudinally of the machine is rotatably supported in the housing 320 centrally below the worm wheel 350, and below the worm wheel 350 is provided with a worm 362 fixed thereto and lying in meshing relationship with respect to the worm 350. At its forward or lefthand end, as viewed in Fig. 11, and as brought out in Fig. 13, the shaft 360 has fixed thereto a worm wheel 363 which lies in mesh with a worm 364 secured to a shaft 366 extending horizontally over the worm wheel 362 and projecting out through the housing 320 beyond the rear face of the machine where it is provided with driving pulley 368. The shaft 366 is rotatably supported in the housing 320 by suitable bearings, as best brought out in Fig. 13.

The pulley 368 is connected by a belt 370, as best brought out in Figs. 1 and 2, with the pulley 372 mounted on the shaft of an electric motor 374 partially housed within the base 30. As will be appreciated, upon rotation of the motor 374 it will act through the pulley 372 and belt 370 to rotate the pulley 368 and, therefore, the shaft 366. The shaft 366, acting through the worm 364 and worm wheel 363, will rotate the shaft 360. The shaft 360, in rotating, will act through the worm 362 and worm wheel 350 to rotate the winch drum 46 and, therefore, apply the desired pull on the wire 24 to draw it through the machine. The reduction afforded through the various worm and worm wheel gearing thus described acts to reduce the rotational speed of the winch drum 46 to that desired for the speed of feed of the wire 24 through the machine and, of course, this rate of rotation may be varied by varying the relative size of the pulleys 368 and 372 or otherwise by varying the relative diameters of one or more of the worm wheel and worm wheel gear sets.

In order for the winch drum 46 to be effective in drawing the wire through the machine, it is, of course, necessary to maintain a tension upon the wire 24 as it is discharged from the winch drum 46. This may be accomplished by employment of the usual or conventional winding reel for the wire 24 and in which means are provided which constantly tend to rotate the winding reel 48 at a faster speed than the wire is delivered to it so that, as the effective diameter of the reel increases as layers of wire build upon it, the tension on the wire will continue to be exerted. While any suitable or conventional means for driving the reel in this manner may be provided, as a matter of illustration in the present case the reel 48 is shown mounted on a shaft 380, as indicated in Fig. 2, rotatably mounted between a pair of bearing bracket supports 382 carrying a pulley 384 fixed thereto midway between them. A belt 386 is trained over the pulleys 334 and 384 so that, upon rotation of the winch drum 46, the reel 48 is simultaneously driven. The size of the pulleys 334 and 384 may be so related that there is a tendency to drive the reel 48 at a peripheral speed in excess of the peripheral speed of the winch drum 46, slipping of the belt 386 on either the pulley 334 or 384, or the use of any suitable or conventional slip type of clutch, being relied upon to obtain the required variation in speed of the winding reel 48 and yet maintain a constant pull on the wire 24 between it and the winch drum 46.

It is, of course, desirable to provide a flow of cutting compound or the like to the wire 24 as it is being operated upon by the cutter blade 142 and by the abrasive plugs 232 during the passage of the wire through the machine. While this may be provided in any suitable or conventional manner, as a matter of illustration means are shown in the accompanying drawings for achieving this result.

Means for providing a flow of cutting compound or the like to the wire 24 as it is being operated upon by the cutter blade 142 is illustrated in Fig. 1, from which it will be noted that the base 30 is interiorly formed to provide a well or receptacle 400 arranged centrally below the point at which the cutter blade 142 acts upon the wire 24. This well or receptacle is adapted to contain a body of cutting compound in the lower portion thereof and this cutting compound is adapted to be picked up by a pump 402 driven by an electric motor 404 and delivered through a pipe 406 which terminates immediately above the wire 24 in transverse alignment with the point at which the cutter blade 142 engages it so as to direct the cutting compound discharged thereby against the wire 24 and cutter blade 142 at this point. The cutting compound thus delivered may drain by gravity back into the well or sump 400 to be again there picked up by the pump 402 and re-delivered to the point of use.

In order to provide a flow of cutting compound to the honing unit 40, a well or sump 410 is formed in the base 30 below the honing unit 40 and similarly to the mechanism just described is provided with a pump 412 in the lower portion thereof driven by an electric motor 414 and adapted to deliver cutting compound from the well or sump 410 through a pipe 416 into the upper portion of the casing 150. In the upper portion of the casing 150 the pipe 416 is connected to a longitudinally extending pipe or header 418, brought out in Figs. 1, 7 and 9, and which header is provided with a multiplicity of small openings 420 through which the cutting compound or the like is delivered toward the wire 24, during its passage through the honing unit 40. This cutting compound or the like drains by gravity to the bottom portion of the casing 150 from which it is returned to the well or sump 410 by means of a return pipe 422, shown in Fig. 7.

For convenience of operation it will be recognized that it is preferable to provide a control panel such as 430 on the front face of the machine and to mount the various switches for controlling the various electric motors above described for controlling the various operations upon such control panel, the buttons 432 for such switches being disposed on the face of the panel 430 so that an operator may control all the operation of the machine from one position.

In operation of the machine thus described and considering the machine to be set up for a particular size wire, it is first necessary to thread a wire of smaller size than that to be worked upon through the machine and around the winch drum 46 and winding wheel 48 in the same manner as the wire to be operated upon. The advanced end of the wire to be operated upon is then welded to the tail end of this smaller wire and the machine started in operation, upon which the smaller wire will draw the wire to be worked on through the machine and thus position it to exert the necessary pull itself. This smaller or lead wire is cut from the end of the finished wire when unreeled from the reel 48 and re-used. Where one length of the wire being operated upon has substantially passed through the machine, then a new reel of the stock wire is set up and its advanced end is connected to the rear end of the reel of wire just finished by means of a short length of such smaller or lead wire in the manner illustrated in Fig. 1 at 450, upon which the drawing operation is resumed. The lead wire 450 is preferably of a smaller diameter than the wire being operated upon so as to permit it to be readily located in the length of finished wire and removed therefrom. Ordinarily it is preferable to provide a conventional type of welding mechanism indicated diagrammatically at 460 for facilitating the welding of the lead or connecting wires to the stock wire being operated upon.

It will be appreciated from the foregoing description and explanation that the present invention provides a mechanism by means of which wire or rod stock may be operated upon at a relatively high speed to remove the surface layer thereof and to produce upon it a smooth exterior surface of improved characteristics.

Formal changes may be made in the specific embodiment of the invention described without departing from the spirit or substance of the broad invention, the scope of which is commensurate with the appended claims.

What is claimed is:

1. Wire finishing apparatus comprising an elongated base, a plurality of tension units mounted on said base and each formed to receive a wire therein, means for drawing a wire successively through said tension units, a cutter unit interposed between a pair of said tension units comprising a hollow rotatable shaft arranged with its axis concentric with a wire passing between said pair of tension units, a cutter blade fixed to said shaft for rotation therewith and provided with a point extending into cutting relation with respect to a wire passing through said cutter unit at a point in close proximity to one of said pair of tension units, the last-mentioned tension unit serving to maintain said wire against movement therein except only in an axial direction and means for rotating said shaft.

2. Wire finishing apparatus comprising an elongated base, a plurality of tension units mounted on said base and each formed to receive a wire therein, means for drawing a wire successively through said tension units, a cutter unit interposed between a pair of said tension units comprising a hollow rotatable shaft arranged with its axis concentric with a wire passing between said pair of tension units, a cutter blade fixed to said shaft for rotation therewith, said cutter blade being inclined axially in the direction of movement of said wire through said cutter unit and terminating in a cutting point in close proximity to the forward edge of that tension unit immediately following said cutter unit in said direction of movement, the last-mentioned tension unit serving to maintain said wire against movement therein except only in an axial direction and means for rotating said shaft.

3. Wire finishing apparatus comprising an elongated base, a plurality of tension units mounted on said base and each formed to receive a wire therein, means for drawing a wire successively through said tension units, a cutter unit interposed between a pair of said tension units comprising a hollow rotatable shaft arranged with its axis concentric with a wire passing between said pair of tension units, a cutter blade fixed to said shaft for rotation therewith and provided with a point extending into cutting relation with respect to a wire passing through said cutter unit, means for supporting a wire from said shaft in relatively close proximity to one of said pair of tension units, the last-mentioned tension unit serving to maintain said wire against movement therein except only in an axial direction the point of said tool being arranged to engage said wire between said supporting means and said one of said tension units, and means for rotating said shaft.

4. Wire finishing apparatus comprising an elongated base, a plurality of tension units mounted on said base and each formed to receive a wire therein, means for drawing a wire successively through said tension units, a cutter unit interposed between a pair of said tension units comprising a hollow rotatable shaft arranged with its axis concentric with a wire passing between said pair of tension units, a cutter blade fixed to said shaft for rotation therewith and provided with a point extending into cutting relation with respect to a wire passing through said cutter unit at a point in close proximity to one of said pair of tension units, the last-mentioned tension unit serving to maintain said wire against movement therein except only in an axial direction a resilient bushing carried by said shaft proximate to said blade and provided with an aperture therein axially aligned with the axis of said shaft and of a size as to relatively closely but slidably and rotatably receive said wire therein, and means for rotating said shaft.

5. Wire finishing apparatus comprising an elongated base, a plurality of tension units mounted on said base and each formed to receive a wire therein, means for drawing a wire successively through said tension units, a cutter unit interposed between a pair of said tension units comprising a hollow rotatable shaft arranged with its axis concentric with a wire passing between said pair of tension units, a cutter blade fixed to said shaft for rotation therewith and provided with a point extending into cutting relation with respect to a wire passing through said cutter unit at a point in close proximity to that one of said pair of tension units on the down-stream side thereof in the direction of movement of said wire, the last-mentioned tension unit serving to maintain said wire against movement therein except only in an axial direction at least one of said tension units comprising a wire drawing die located in advance of said cutter unit additionally functioning to control the diameter of said wire to within close limits whereby to provide a constant depth of cut for said blade, and means for rotating said shaft.

6. Wire finishing apparatus comprising an elongated base, a plurality of tension units mounted on said base and each formed to receive a wire therein, means for drawing a wire successively through said tension units, at least one of said tension units comprising a wire drawing die of a size to effect a reduction in the diameter of said wire and others of said tension units each comprising a plurality of parts between which said wire is adapted to pass, one of which parts is rigidly fixed with respect to said base and the remainder of which are spring pressed toward the fixed part to frictionally grip said wire therebetween, a cutter head interposed between a pair of said units on the down-stream side of said one of said tension units and at least one of said other of said tension units, comprising a hollow rotatable shaft arranged with its axis concentric with a wire passing between said pair of tension units, a cutter blade fixed to said shaft for rotation therewith and provided with a point extending into cutting relation with respect to a wire passing through said cutter unit at a point in close proximity to one of said pair of tension units, and means for rotating said shaft.

7. Wire finishing apparatus comprising an elongated base, a plurality of tension units mounted on said base and each formed to receive a wire therein, means for drawing a wire successively through said tension units, one of said tension units comprising a wire drawing die and another of said units having means incorporated therein for frictionally gripping said wire without reducing the size thereof, a cutter head on the down-stream side of the wire drawing die comprising a hollow rotatable shaft with its axis concentric with a wire passing between the tension units, a cutter blade fixed to said shaft for rotation therewith and provided with a point extending into cutting relation with respect to a wire passing through said cutter head at a point in close proximity to said another of said tension units and on the up-stream side of the latter, the last-mentioned tension unit serving to maintain said wire against movement therein except only in an axial direction and means for rotating said shaft.

JOSEPH H. HOERN.